United States Patent
Minamikawa (10) Patent No.: US 6,695,126 B2
(45) Date of Patent: Feb. 24, 2004

(54) DEVICE AND METHOD FOR TRANSPORTING BODY

(75) Inventor: Akira Minamikawa, Mie (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/129,007

(22) PCT Filed: Sep. 12, 2001

(86) PCT No.: PCT/JP01/07900
§ 371 (c)(1),
(2), (4) Date: May 1, 2002

(87) PCT Pub. No.: WO02/22433
PCT Pub. Date: Mar. 21, 2002

(65) Prior Publication Data
US 2002/0175053 A1 Nov. 28, 2002

(30) Foreign Application Priority Data
Sep. 14, 2000 (JP) .......................................... 2000-279834

(51) Int. Cl.[7] .............................. B61B 12/02; B61B 3/00; B65G 17/20; B65G 17/32; B65G 29/00
(52) U.S. Cl. ................. 198/680; 198/678.1; 198/476.1; 104/89; 104/172.4
(58) Field of Search ............................... 198/678.1, 682, 198/473.1, 474.1, 476.1, 485.1, 487.1, 680; 104/89, 172.4; 105/148

(56) References Cited

U.S. PATENT DOCUMENTS

| | | | | | |
|---|---|---|---|---|---|
| 4,579,062 A | * | 4/1986 | Clark et al. | .................... | 104/89 |
| 5,340,249 A | * | 8/1994 | Nakamura | .................. | 105/148 |

FOREIGN PATENT DOCUMENTS

| | | |
|---|---|---|
| JP | 58-199276 | 11/1983 |
| JP | 62-130997 | 6/1987 |
| JP | 62-205915 | 9/1987 |
| JP | 4-269133 | 9/1992 |
| JP | 6-156662 | 6/1994 |

* cited by examiner

Primary Examiner—Gene O. Crawford
(74) Attorney, Agent, or Firm—Sughrue Mion, PLLC (57) ABSTRACT

A vehicle body transfer apparatus (1) that hangs and transfers a vehicle body (F) of every vehicle type is provided. The apparatus (1) includes a hanger (20) that supports the vehicle body (F) in a hanging condition, and moves along a transfer path (25), and vehicle body support parts (32, 32) that adjust supporting positions on the vehicle body (F) in the hanger (20) based upon a center of gravity of the vehicle body (F) of each vehicle type. The hanger (20) includes center-of-gravity management plates (22, 22, 23, 23) having a plurality of vehicle body support parts that support the vehicle body (F) according to the vehicle type of the vehicle body.

8 Claims, 8 Drawing Sheets

DEVICE AND METHOD FOR TRANSPORTING BODY

FIELD OF THE INVENTION

This invention relates to an apparatus and method for transferring vehicle bodies that hang and transfer vehicle bodies, and more particularly to an apparatus and method for transferring vehicle bodies that make a hang condition of the vehicle bodies stable.

BACKGROUND ART

On an automotive assembly line, a plurality of vehicle body transfer apparatuses are used as corresponding to parts to be mounted, and positions in the vehicle bodies where the parts are mounted, to transfer the vehicle bodies and mount various parts. As such vehicle body transfer apparatuses, for example, an overhead conveyor or the like is used to mount parts to be attached from underside in the vehicle bodies, while a friction conveyor is used to mount an interior parts or the like in the vehicle bodies. The overhead conveyor supports the vehicle body using a hanger suspended on a transfer rail, and moves the hanger along the transfer rail. The hanger includes four arms in right and left sides of front and rear positions, and supports the vehicle body at four spots in right and left sides of front and rear portions thereof with vehicle body support parts of the four arms. The friction conveyor places the vehicle body on each pallet, and moves the pallet along the transfer rail. If the vehicle body is attached with tires, the tires are directly placed on the pallet, but if the vehicle body is not attached with tires, the bottom portion of the vehicle body is placed on the vehicle body support parts.

On the automotive assembly line, not only vehicle bodies of a single vehicle type, but also vehicle bodies of various vehicle types are assembled. Therefore, the vehicle body transfer apparatus such as the overhead conveyor is required to transfer vehicle bodies each having different total length and weight. For example, Japanese Laid-Open Patent Application, Publication No. 2-117508 discloses a vehicle transfer apparatus that holds front and rear wheels of a vehicle, and hangs and transfers the vehicle. This vehicle transfer apparatus includes a mechanism that may move any one of a front-wheel holding member and a rear-wheel holding member in front and rear directions, and may thus transfer vehicles having different wheel bases.

However, the overhead conveyor supports the vehicle body by hanging the same, and is thus likely to have difficulty in maintaining stability of the vehicle body during transfer in comparison with a friction conveyor that transfers the vehicle body by placing the vehicle body thereon. Further, as discussed above, the total length, weight, or the like of the vehicle body varies with the types of the vehicles, and thus the weight balance of the vehicle body varies with the types of the vehicles. Therefore, if the vehicle bodies of various vehicle types having different weight balance were supported using a hanger having immovable arms provided on right and left sides of front and rear portions of the vehicle body, the stability of the vehicle bodies during transfer would get worse. In particular, when the transfer direction of the overhead conveyor is inclined upward or downward due to the factory layout or the like, the vehicle bodies supported with the hangers are transferred in a vertically inclined posture. Consequently, among overhead conveyors are those having a hanger that moves the arms' positions in front, rear, right, and left directions according to the type of the vehicle body (i.e., the whole length and/or weight balance of the vehicle body), and support the vehicle body, in order to secure stability of the vehicle body. In that event, the hanger needs a complex mechanism for moving the arms in front, rear, right, and left directions.

DISCLOSURE OF THE INVENTION

Therefore, it is an object of the present invention to provide an apparatus and method for transferring vehicle bodies that can stably transfer the vehicle bodies of various vehicle types with a simple structure.

An apparatus for transferring vehicle bodies according to the present invention, which can achieve the above object, is that which hangs and transfers a vehicle body of every vehicle type. The apparatus comprises a hang-and-transfer means that supports the vehicle body in a hanging condition, and moves along a transfer path, and a position adjustment means that adjusts supporting positions on the vehicle body in the hang-and-transfer means based upon a center of gravity of the vehicle body of each vehicle type.

According to this apparatus for transferring vehicle bodies, the position adjustment means moves the vehicle body frontward and rearward to a position in which a center of gravity of the vehicle body of every vehicle type and a center of the hang-and-transfer means are aligned or substantially aligned with each other. Therefore, the apparatus for transferring vehicle bodies may support the vehicle body in a well-weight-balanced condition in the hang-and-transfer means, and thus may stably transfer the vehicle body.

Moreover, in the above apparatus for transferring vehicle bodies, the hang-and-transfer means may include center-of-gravity management plates each having a plurality of vehicle body support parts that support the vehicle body according to the vehicle type of the vehicle body.

According to this apparatus for transferring vehicle bodies, distances between the vehicle body support parts of the center-of-gravity management plates each provided on the arms at right and left sides of front and rear portions of the hang-and-transfer means vary with the vehicle type of the vehicle body. Therefore, this apparatus for transferring vehicle bodies allows the vehicle body support parts to support the vehicle body according to the vehicle type of the vehicle body, and thereby the center of gravity of the vehicle body of every vehicle type and the center of the hang-and-transfer means may be aligned or substantially aligned with each other. Consequently, variations in the total length and/or weight balance according to the vehicle type would not require any mechanism for moving positions of the arms of the hang-and-transfer means in the front, rear, right, and left directions, which thus serves to simplify the structure of the hang-and-transfer means adaptable to varying vehicle types.

A method for transferring vehicle bodies according to the present invention, which can achieve the above object, is that which hangs and transfers a vehicle body of every vehicle type. The method includes a position adjustment step of adjusting supporting positions on the vehicle body in a hang-and-transfer means based upon a center of gravity of the vehicle body of each vehicle type, which hang-and-transfer means supports the vehicle body in a hanging condition and moves along a transfer path.

According to this method for transferring vehicle bodies, in the position adjustment step, the vehicle body is moved frontward and rearward to a position at which the center of gravity of the vehicle body of every vehicle type and a center of the hang-and-transfer means are aligned or substantially aligned with each other. Therefore, this method for transferring vehicle bodies may serve to support the vehicle body in a well-weight-balanced condition in the hang-and-transfer means, and thus may serve to stably transfer the vehicle body.

Moreover, in the above method for transferring vehicle bodies, the hang-and-transfer means may include center-of-gravity management plates each having a plurality of vehicle body support parts that support the vehicle body according to the vehicle type of the vehicle body, and the position adjustment step may allow the vehicle body support part to place the vehicle body according to the vehicle type.

According to this method for transferring vehicle bodies, distances between the body support parts of the center-of-gravity management plates each provided on the arms at right and left sides of front and rear portions of the hang-and-transfer means vary with the vehicle type of the vehicle body. Therefore, this method for transferring vehicle bodies allows the vehicle body support parts to support the vehicle body according to the vehicle type of the vehicle body, and thereby the center of gravity of the vehicle body of every vehicle type and the center of the hang-and-transfer means may be aligned or substantially aligned with each other. Consequently, changes in the total length and/or weight balance according to the vehicle type would not require any mechanism for moving positions of the arms of the hang-and-transfer means in the front, rear, right, and left directions, which thus serves to simplify the structure of the hang-and-transfer means adaptable to varying vehicle types.

Other objects and further features of the present invention will become readily apparent from the following description of preferred embodiments with reference to accompanying drawings.

BRIEF DESCRIPTION OF THE DRAWINGS

FIGS. 3(a) and 3(b) show an overhead conveyor according to the present embodiment.

FIGS. 4(a) and 4(b) show center-of-gravity management plates of the overhead conveyor as shown in FIGS. 3(a) and 3(b)

FIGS. 5(a) and 5(b) show vehicle body support parts for relocation of a drop lifter according to the present embodiment.

FIGS. 6(a), 6(b) and 6(c) show a hanger position determining part of the drop lifter according to the present embodiment.

FIGS. 7(a) and 7(b) are diagrams for explaining an operation of the apparatus for transferring vehicle bodies according to the present embodiment.

FIGS. 8(a) and 8(b) are diagrams for explaining an operation of the apparatus for transferring vehicle bodies according to the present embodiment.

BEST MODE FOR CARRYING OUT THE INVENTION

Referring now to the accompanying drawings, a description will be given of preferred embodiments of the apparatus and method for transferring vehicle bodies according to the present invention.

The apparatus and method for transferring vehicle bodies according to the present invention adjust vehicle body support positions in a hang-and transfer means based upon each center of gravity of the vehicle body of every vehicle type. Particularly, this apparatus and method for transferring vehicle bodies adjust a position of the vehicle body so as to allow vehicle body support parts of center-of-gravity management plates so provided as to correspond to the type of each vehicle to support the vehicle body. Thus, the vehicle body is supported by the hang-and-transfer means in such a position that the center of gravity of the vehicle body of each vehicle type and a center of the hang-and-transfer means may be aligned or substantially aligned with each other. Accordingly, this apparatus and method for transferring vehicle bodies provide well-weight-balanced support using the hang-and-transfer means for the vehicle body according to the type of the vehicle body, and may thereby achieve excellently stable transfer of the vehicle body.

The present embodiment applies the inventive apparatus and method for transferring vehicle bodies to an overhead conveyor provided in an automotive assembly line for constructing four-wheel automobiles. In addition, the present embodiment incorporates a position adjustment means for adjusting the vehicle body support positions in a drop lifter that relocates the vehicle body conveyed via a friction conveyor provided at the end of the painting line onto the overhead conveyor. Further, in the present embodiment, it is supposed that three types of vehicle bodies including large-, medium-, and small-sized passenger cars are transferred with this overhead conveyor.

Further, in the present embodiment, a front/rear direction denotes a longitudinal direction of the vehicle body, and a direction of transfer of each conveyor. A right/left direction denotes a width direction of the vehicle body, and a direction perpendicular to the direction of transfer of each conveyor.

Next, with reference to FIGS. 1 through 6, a description will be given of a structure of the apparatus for transferring vehicle bodies according to the present embodiment.

A vehicle body transfer apparatus 1, which hangs and transfers a vehicle body F of every vehicle type, serves to adjust a vehicle body support position during a hang-and-transfer process. To be more specific, the vehicle body transfer apparatus 1 accommodates the variations in weight balance among the types of each vehicle body F with center-of-gravity management plates 22, 22, 23, 23, without changing front-rear distances and right-left distances of arms 21, 21 of a hanger 20. For that purpose, the vehicle body transfer apparatus 1 is comprised of an overhead conveyor 2 for hanging and transferring the vehicle body F, and a drop lifter 3 having a means for adjusting positions on the vehicle body F at which the vehicle body F is supported (see FIGS. 1 and 2). The drop lifter 3 is a relocation means that relocates the vehicle body F conveyed through a friction conveyor 4 onto the overhead conveyor 2.

Figure 1:
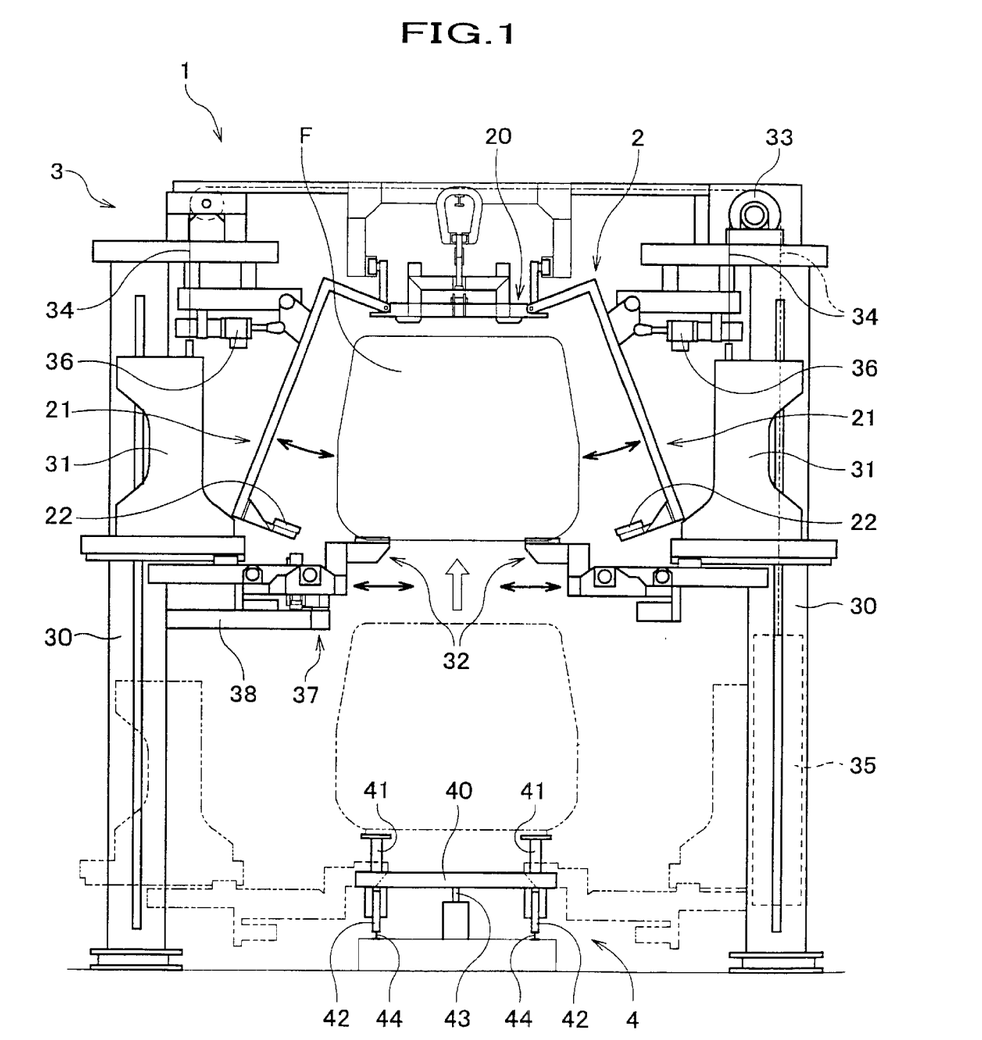
FIG. 1 is a front view of an apparatus for transferring vehicle bodies according to the present embodiment.
Figure 2:
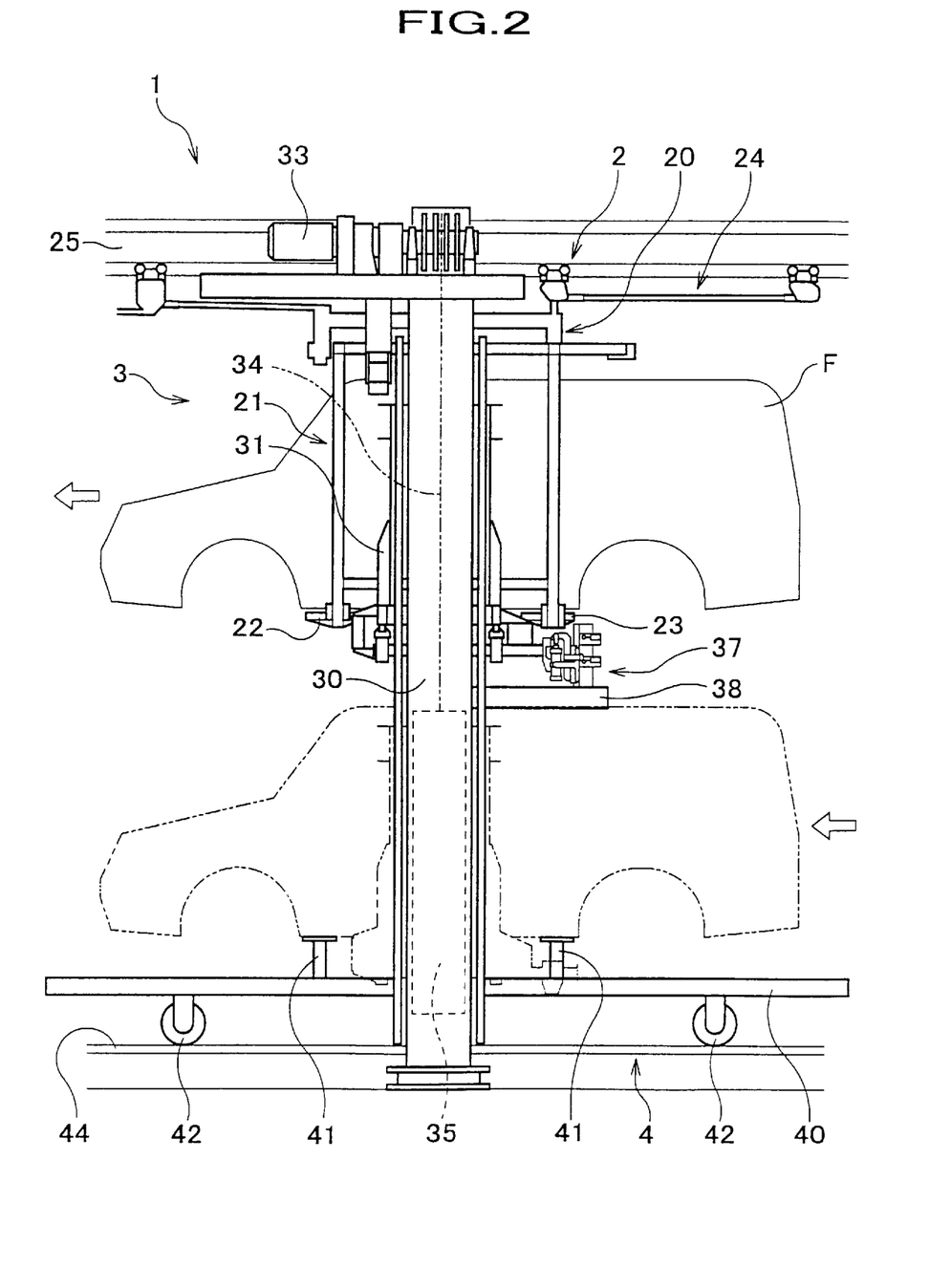
FIG. 2 is a side view of the apparatus for transferring vehicle bodies according to the present embodiment.

A description will herein be given of a structure of the friction conveyor 4 with reference to FIGS. 1 and 2. The friction conveyor 4 is provided at the end of the painting line, and transfers the painted vehicle bodies F to the staring point of the automotive assembly line. The friction conveyor 4 supports the vehicle bodies F, . . . on a number of pallets 40, . . . , and the pallets 40, . . . move along transfer rails 44, 44 with their front and rear ends being in contact with adjacent rails' rear or front end. Each pallet 40 has four vehicle body support parts for transfer 41, . . . in total at front and rear portions of each side on a top thereof, and these vehicle body support parts for transfer 41, . . . are used to support jack-up points of the vehicle body F. Moreover, each pallet 40 has four wheels 42, . . . in total at front and rear portions of each side on a bottom thereof, and the wheels 42, . . . engage with the transfer rails 44, 44. By the way, the pallet 40 is fixed at a specified position with a pallet fixing part 43 when the vehicle body F is relocated thereon.

A description will next be given of a structure of the overhead conveyor 2 with reference to FIGS. 1 through 4. The overhead conveyor 2 is provided at the starting point of the automotive assembly line, and keeps the vehicle body F hanging down to transfer the same.

Moreover, the overhead conveyor 2 supports the vehicle body F in such a manner that the center of gravity of the vehicle body F of every vehicle type and the center of the hanger 20 are substantially aligned (or are precisely aligned) with each other, in order to hang the vehicle body F of every vehicle type in a stable condition. The center of the hanger 20 is in the middle of front-rear length, and right-left width with datum given from front arms 21a, 21a and rear arms 21b, 21b provided at right and left sides of front and rear ends of the hanger 20, and thus is a two-dimensional center. Accordingly, when the center of gravity of the vehicle body F of every vehicle type and the center of hanger 20 are substantially aligned, (two-dimensional) coordinates on the horizontal plane including the center of gravity of the vehicle body F is substantially aligned with the central position of the hanger 20. By the way, if the center of gravity of the vehicle body F of every vehicle type and the center of the hanger 20 are precisely aligned with each other, the stability during transfer will be much more improved. However, if the vehicle body F is never deviated from a position first supported with respect to the hanger 20 (i.e., stability is secured enough) with consideration given to transfer conditions such as in case where the vehicle body F is most sharply inclined upward or downward, precise alignment would not necessarily be required. Moreover, the vehicle body F is mounted with various parts during transfer, and thus has the center of gravity thereof shifted to some extent from the position where the center of gravity is located when the vehicle body F is first supported.

The overhead conveyor 2 principally includes hangers 20, . . . , trolley parts 24, . . . , a transfer rail 25, and a driving source (not shown). Each hanger 20 includes arms 21, 21, front center-of-gravity management plates 22, 22, rear center-of-gravity management plates 23, 23, and the like. Moreover, each hanger 20 is suspended down from the transfer rail 25 through the trolley part 24. In the overhead conveyor 2, each trolley part 24 provided on the corresponding hanger 20 is coupled with the front and rear adjacent trolley parts 24, 24, and the hangers 20, . . . are coupled through the trolley parts 24, . . . . In addition, the overhead conveyor 2 utilizes the trolley parts 24, . . . to keep each front/rear space at regular intervals, and the trolley parts 24, . . . are driven by the aforementioned driving source, to move the hangers 20, . . . along the transfer rail 25.

In the present embodiment, the hanger 20 corresponds to the hang-and-transfer means set forth in the claims; the center-of-gravity management plates 22, 22, 23, 23 correspond to the center-of-gravity management plates set forth in the claims; and the transfer rail 25 corresponds to the transfer path set forth in the claims.

The hanger 20 has a trolley support frame 20a provided in an upper middle portion thereof, and coupled with the trolley part 24. The hanger 20 is provided with an arm support frame 20b below the trolley support frame 20a. Moreover, in the hanger 20 are pivotably provided arms 21, 21 at both of right and left sides of the arm support frame 20b. The arms 21, 21 are closed when supporting the vehicle body F, and opened to both of right and left sides when releasing the vehicle body F, using an open/close mechanism (not shown) of the hanger 20. In addition, the arms 21, 21, when closed, are locked in such a state as to hold the vehicle body F (as indicated by solid lines in FIG. 3(a)), and, when opened, are locked in such a state that the vehicle body F is vertically movable with the drop lifter 3 (as indicated by a dash-double dot lines in FIG. 3(a)), using an open/close lock mechanism (not shown) of the hanger 20.

The arm 21 has one end (upper end) of a front arm 21a provided at a front end of a front/rear support frame 21c extending in front/rear direction, and one end (upper end) of a rear arm 21b provided at a rear portion of the front/rear support frame 21c. In addition, the arm 21 supports a portion at the side of the other end (lower end) of the front arm 21a, and a portion at the side of the other end (lower end) of the rear arm 21b by coupling these portions via a support frame 21d.

The front arm 21a includes a main frame 21e that extends in an up-and-down (vertical) direction when supporting the vehicle body F. Further, in the front arm 21a at the other end (lower end) of the main frame 21e is perpendicularly provided a support frame 21f extending inwardly in a right-and-left direction of the hanger 20. In the front arm 21a at one end (upper end) of the main frame 21e is also perpendicularly provided a coupling frame 21g extending inwardly in a right-and-left direction of the hanger 20. The coupling frame 21g is pivotably provided on the arm support frame 20b. At a distal end of the support frame 21f is provided a front center-of-gravity management plate 22.

The rear arm 21b includes a main frame 21h that extends in an up-and-down (vertical) direction when supporting the vehicle body F. Further, in the rear arm 21b at the other end (lower end) of the main frame 21h is perpendicularly provided a support frame 21i extending inwardly in a right-and-left direction of the hanger 20. In the rear arm 21b at one end (upper end) of the main frame 21h is also perpendicularly provided a coupling frame 21j extending inwardly in a right-and-left direction of the hanger 20. The coupling frame 21j is pivotably provided on the arm support frame 20b. At a distal end of the support frame 21i is provided a rear center-of-gravity management plate 23.

The front center-of-gravity management plate 22 includes a base 22a, in which jack-up point support parts 22b, 22c, 22d for supporting jack-up points in a front portion of the vehicle body F when the arm 21 is closed are formed. The base 22a is shaped like a rectangular plate, and made of rubber. The jack-up point support parts 22b, 22c, 22d are so shaped as to receive the jack-up points of the vehicle body F of every vehicle type, and each form a concave shape in the base 22a. The jack-up point support parts 22b, 22c, 22d are formed together with jack-up points 23b, 23c, 23d in a position that allows the center of gravity of the vehicle body F of every vehicle type and the center of the hanger 20 to be substantially aligned (or precisely aligned) so that the hanger 20 may support the vehicle body F. It is understood that the jack-up point support part 22b supports a front jack-up point of the vehicle body F of a large-sized passenger car, the jack-up point 22c supports a front jack-up point of the vehicle body F of a medium-sized passenger car, and the jack-up point 22d supports a front jack-up point of the vehicle body F of a small-sized passenger car.

The rear center-of-gravity management plate 23 includes a base 23a, in which jack-up point support parts 23b, 23c, 23d for supporting jack-up points in a rear portion of the vehicle body F when the arm 21 is closed are formed. The base 23a is shaped like a rectangular plate, and made of rubber. The jack-up point support parts 23b, 23c, 23d are so shaped as to receive the jack-up points of the vehicle body F of every vehicle type, and each form a concave shape in the base 23a. The jack-up point support parts 23b, 23c, 23d are formed between jack-up point support parts 23b, 23c, 23d and jack-up point support parts 22b, 22c, 22d in a position that allows the center of gravity of the vehicle body F of every vehicle type and the center of the hanger 20 to be substantially aligned (or precisely aligned) so that the hanger 20 may support the vehicle body F. It is understood that the jack-up point 23b supports a rear jack-up point of the vehicle body F of a large-sized passenger car, the jack-up point 23c supports a rear jack-up point of the vehicle body F of a medium-sized passenger car, and the jack-up point 23d supports a rear jack-up point of the vehicle body F of a small-sized passenger car.

In case of the vehicle body F of a large-sized passenger car, for example, the jack-up point support parts 22b, 22b and the jack-up point support parts 23b, 23b are formed in such a position as to support the four jack-up points, each of which is located at front and rear portions of right and left sides, of the vehicle body F of the large-sized passenger car. When the vehicle body F of the large-sized passenger car is supported by the jack-up point support parts 22b, 22b, 23b, 23b, the center of gravity of the vehicle body F and the center of the hanger 20 are substantially aligned (or precisely aligned) with each other. Consequently, the vehicle body F is supported in a well-weight-balanced condition to the hanger 20, and thus stability in all postures of the vehicle body F during transfer is secured.

In the present embodiment, the jack-up point support parts 22b, 22c, 22d, 23b, 23c, 23d correspond to the vehicle body support parts set forth in the claims.

The trolley part 24 is coupled with the hanger 20 through coupling parts 24a, 24b provided at two spots in front and at the rear of the trolley support frame 20a. The front coupling part 24a is provided with a front load bar 24c frontward, while the rear coupling part 24b is provided with a rear load bar 24d rearward. The front load bar 24c and rear load bar 24d have a predetermined length in consideration of a total length of the vehicle body F of the large-sized passenger car, and the like in order to secure front and rear intervals of the hanger 20. At an upper end of the front coupling part 24a are provided rollers 24e, 24e that engage with the transfer rail 25 and rotate. At an upper end of the rear coupling part 24b are provided rollers 24f, 24f that engage with the transfer rail 25 and rotate. At a front end of the front load bar 24c is provided an inter-trolley part coupling part 24g for coupling with the trolley part 24 in front. At a rear end of the rear load bar 24d is provided an inter-trolley part coupling part 24h for coupling with the trolley part 24 in rear. The trolley part 24 is coupled with the trolley part 24 in front through the inter-trolley part coupling part 24g, and with the trolley part 24 in rear through the inter-trolley part coupling part 24h. Further, at an upper end of the inter-trolley part coupling part 24g are provided rollers 24j, 24j that engage with the transfer rail 25 and rotate. At an upper end of the inter-trolley part coupling part 24h are provided rollers 24i, 24i that engage with the transfer rail 25 and rotate.

Next, a description will be given of a structure of the drop lifter 3 with reference to FIGS. 1, 2, 5, and 6. The drop lifter 3 principally includes posts 30, 30, sliders 31, 31, vehicle body support parts for relocation 32, 32, a motor 33, wires 34, 34, 34, a counter weight 35, arm open/close parts 36, 36, a hanger position determined part 37, and the like. The drop lifter 3 relocates the vehicle body F conveyed through the friction conveyor 4 onto the overhead conveyor 2, and adjusts positions supported with the hanger 20 during transfer by moving the vehicle body F in front, rear, right, and left directions according to the type of the vehicle body F. It is understood that the drop lifter 3 is under control of a controller (not shown) for controlling each section of the drop lifter 3, and therefore includes such a controller in the configuration. The controller may be either a dedicated controller for the drop lifter 3, or a controller or the like that controls the overall automotive assembly line.

The posts 30, 30 are vertically provided at both of right and left sides of the hanger 20 of the overhead conveyor 2, and the pallet 40 of the friction conveyor 4. The posts 30, 30 are transfer paths for the sliders 31, 31, and the sliders 31, 31 engage with the posts 30, 30 to go up and down.

The sliders 31, 31 each engage with the right and left posts 30, 30 respectively, and move up and down along the posts 30, 30 between the friction conveyor 4 and the overhead conveyor 2. Each slider 31 moves up and down by a driving force of the motor 33 transmitted through the wire 34. Moreover, the motor 33 is connected with the counter weight 35 through the wire 34, and the weight is balanced between the counter weight 35, and the sliders 31, 31 with the vehicle body F. Accordingly, not so great driving force supplied from the motor 33 could move up and down the sliders 31, 31. A pair of the sliders 31, 31 are driven to move up and down by a single unit of the motor 33.

The vehicle body support parts for relocation 32, 32 are provided in a direction inwardly opposite to each other at the bottom of respective sliders 31, 31, and support side sills of the vehicle body F. The vehicle body support parts for relocation 32, 32 are movable along rails 31a, of the sliders 31, 31 in a right or left direction (i.e., a direction in which the parts 32, 32 may approach to/separate from the vehicle body F) (see FIGS. 5(a) and 5(b)), and thus are brought closest together when supporting the vehicle body F, and farthest apart when placing the vehicle body F onto the hanger 20. Moreover, the vehicle body support parts for relocation 32, 32 move the vehicle body F while having the vehicle body F placed thereon in a frontward or rearward direction to adjust the support positions. Specifically, when the support positions are adjusted using the vehicle body support parts for relocation 32, 32, the vehicle body F is so positioned that the front jack-up points are placed directly above any one set of the jack-up point support parts selected according to the vehicle type among the jack-up point support parts 22b, 22c, 22d of the front center-of-gravity management plate 22, and that the rear jack-up points are placed directly above any one set of the jack-up point support parts selected according to the vehicle type among the jack-up point support parts 23b, 23c, 23d of the rear center-of-gravity management plate 23 (see FIGS. 4(a) and 4(b)).

In the present embodiment, the vehicle body support parts for relocation 32, 32 correspond to the position adjustment means set forth in the claims.

Figure 5A:
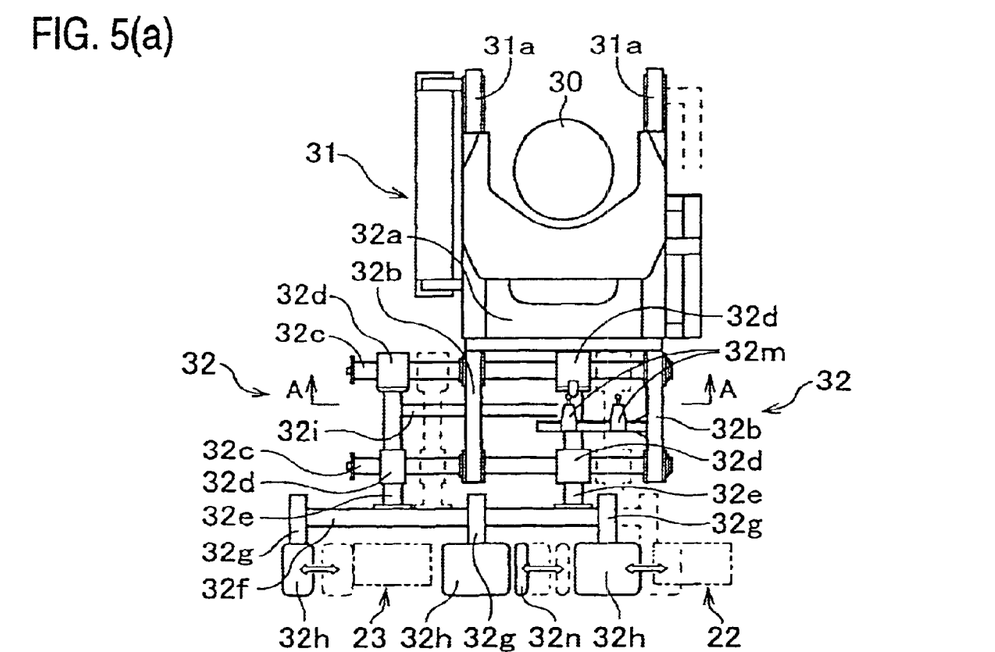
FIG. 5(a) is a front view.
Figure 5B:
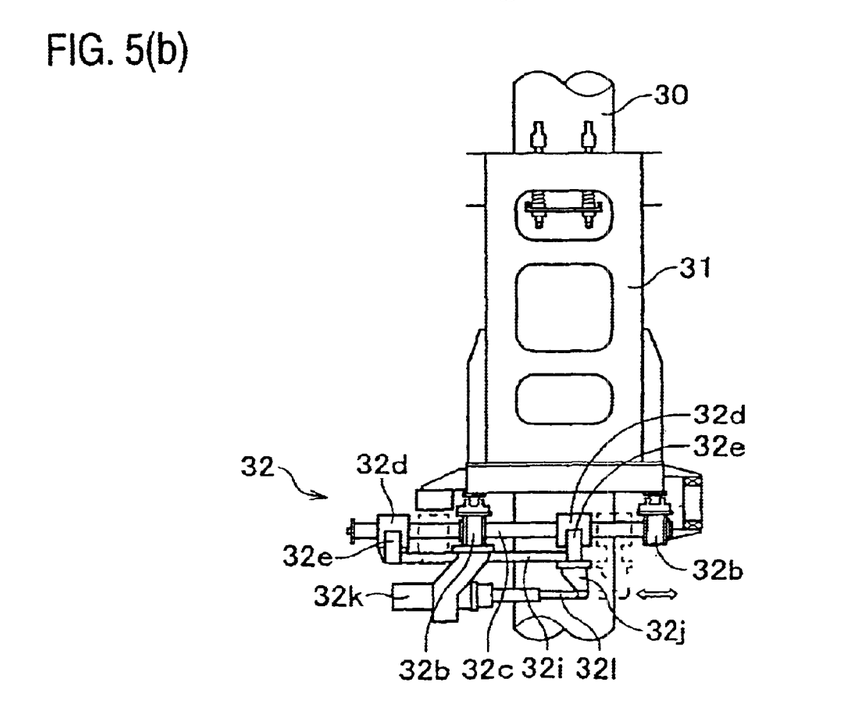
FIG. 5(b) is a sectional view taken along the line A—A.

In order to achieve the aforementioned features, each vehicle body support part for relocation 32 includes a main body 32a, support frames 32b, 32b, frontward/rearward guide rails 32c, 32c, movable joints 32d, 32d, 32d, 32d, movable frames 32e, 32e, a coupling frame 32f, placement frames 32g, 32g, 32g, vehicle body placement parts 32h, 32h, 32h, a driving frame 32i, a driving joint 32j, an air cylinder 32k, a piston 32l, stoppers 32m, 32m, a seating sensor 32n, and air intake/supply device (not shown) (see FIG. 5).

The vehicle body support part for relocation 32 is so configured that the main frame 32a is movable along the rails 31a, 31a of the slider 31 in right and left directions, and is provided on two spots in front and rear directions at a distal end thereof with support frames 32b, 32b. The support frames 32b, 32b are linked together with frontward/rearward guide rails 32c, 32c. The frontward/rearward guide rails 32c, 32c have a front side thereof supported by the support frame 32b, and a rear side thereof passing through the support frame 32b and extending in a rear direction.

Each frontward/rearward guide rail 32c is surrounded at two spots located on front and rear portions thereof with movable joints 32d, 32d that is movable frontward and rearward. Further, the movable frame 32e is so provided to link the two movable joints 32d, 32d provided on the front portion together, and the movable frame 32e is so provided to link the two movable frames 32e, 32e provided on the rear portion together. The distal ends of the two movable frames 32e, 32e are linked by the coupling frame 32f, and the coupling frame 32f moves frontward or rearward as the movable joints 32d, . . . move frontward or rearward. The two movable frames 32e, 32e are linked by the driving frame 32i provided on lower portions thereof, and the driving frame 32i moves frontward or rearward, as the piston 32l in the air cylinder 32k moves frontward or rearward. The distal end of the piston 32l is connected with the driving frame 32l via the driving joint 32j.

Moreover, the coupling frame 32f is provided at three portions arranged in the rear-front direction with the vehicle body placement parts 32h, 32h, 32h through the placement part frames 32g, 32g, 32g. The vehicle placement parts 32h, 32h, 32h support the three portions arranged in the rear-front direction of the side sill of the vehicle body F placed thereon during relocation. Further, the three vehicle body placement parts 32h, 32h, 32h have the rear vehicle placement part 32h designed smaller in top area than the other vehicle placement parts 32h, 32h. When the vehicle body F is relocated, the two front vehicle placement parts 32h, 32h are located between the front center-of-gravity management plate 22 and the rear center-of-gravity management part 23. The rearmost vehicle body placement part 32h is disposed to support a rear portion of the vehicle body F of the large-sized passenger car. Further, at a front side of the middle of vehicle body placement part 32h is provided the seating sensor 32n, which transmits a signal for indicating whether or not the vehicle body F is supported by the vehicle body support part for relocation 32 to the above-mentioned controller.

The vehicle body support part for relocation 32 configured as described above takes in air from the air cylinder 32k, or supplies air to the air cylinder 32k, to drive the air cylinder 32k using the air intake/supply device (not shown). The vehicle body support part for relocation 32 is so configured that the vehicle body placement parts 32h, 32h, 32h place the vehicle body F thereon through the driving joint 32j, the driving frame 32i, the movable frames 32e, 32e, the coupling frame 32f, the placement part frames 32g, 32g, 32g, and move frontward or rearward when the pin 32l in the air cylinder 32k moves frontward or rearward. The front/rear movement of the vehicle body support part for relocation 32 is restricted by the stoppers 32m, 32m.

The arm open/close parts 36, 36 are provided above each post 30, 30, and actuated by the open/close mechanism and open/close lock mechanism for the hanger 20 of the overhead conveyor 2. To be more specific, the arm open/close parts 36, 36 are actuated by the open/close mechanism to open or close the arms 21, 21 to the right and left sides. The arm open/close parts 36, 36 are also actuated by the open/close lock mechanism of the hanger 20 to lock the arms 21, 21 in an open or closed state.

The hanger position determination part 37 determines whether the hanger 20 has stopped at a predetermined position relative to the drop lifter 3 when the vehicle body F is relocated. Accordingly, if the vehicle body F has not stopped at a predetermined position relative to the hanger 20, the vehicle body support parts for relocation 32, 32 adjust the support positions of the vehicle body F according to the vehicle type of the vehicle body F. Assuming for example that the relative position between the vehicle body support parts for relocation 32, 32 and the center-of-gravity management plates 22, 22, 23, 23 are displaced in the front/rear direction. Therefore, the front jack-up points of the vehicle body F are not located directly above any one of the jack-up point support parts to be selected according to the vehicle type among the jack-up point support parts 22b, 22b, 22c, 22c, 22d, 22d of the front center-of-gravity management plate 22, 22, and the rear jack-up points of the vehicle body F are not located directly above any one of the jack-up point support parts to be selected according to the vehicle type among the jack-up point support parts 23b, 23b, 23c, 23c, 23d, 23d of the rear center-of-gravity management plate 23, 23. Accordingly, the hanger position determination part 37 determines before the vehicle body F is relocated onto the hanger 20 whether the hanger 20 is located at the predetermined position. The hanger position determination part 37 determines the position of the hanger 20 by checking the position of one of the rear arms 21b, 21b.

Figure 6A:
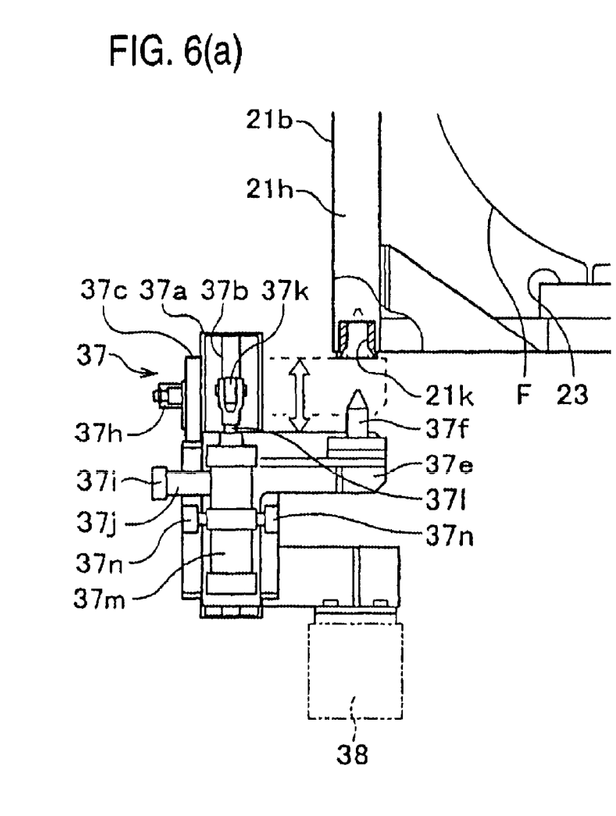
FIG. 6(a) is a front view.
Figure 6B:
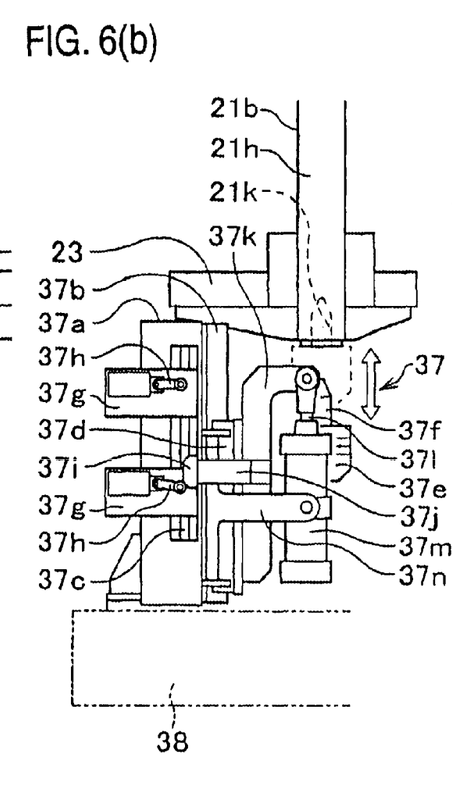
FIG. 6(b) is a side view.
Figure 6C:
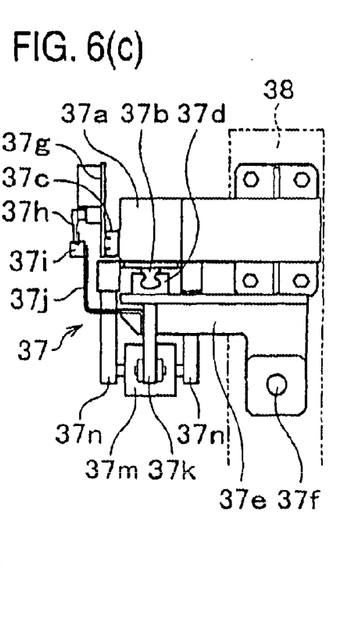
FIG. 6(c) is a plan view.

In order to achieve the aforementioned features, the hanger position determination part 37 includes a main body 37a, a position determination pin rail 37b, a limit switch rail 37c, a slider 37d, a support bracket 37e, a position determination pin 37f, limit switch sliders 37g, 37g, limit switches 37h, 37h, a vertical position determination part 37i, a coupling frame 37j, a piston frame 37k, a piston 37l, an air cylinder 37m, support brackets 37n, 37n, air intake/supply device (not shown), and the like (see FIG. 6). Also in one of the rear arms 21b, 21b a position determination hole 21k is provided at a bottom of the main frame 21h.

In the hanger position determination part 37, the main body 37a is perpendicularly provided with respect to the rear frame 38 of the drop lifter 3. At a front side of the main body 37a is provided the position determination pin rail 37b, and at an outer side thereof is provided the limit switch rail 37c. With the position determination pin rail 37b is engaged a slider 37d, which is guided in a front/rear direction. Further, the slider 37d is attached with the support bracket 37e, and at a distal end of the support bracket 37e, the position determination pin 37f is perpendicularly provided. The position determination pin 37f is so shaped as to be insertable into the position determination hole 21k of the hanger 20, and is so located as to inserted into the position determination hole 21k when the hanger has stopped at a predetermined position with respect to the drop lifter 3. The predetermined position is a position where the vehicle body F may be relocated from the vehicle body support parts for relocation 32, 32 to the jack-up point support parts 22*b* through 22*d*, 23*b* through 23*d* of the center-of-gravity management plates 22, 22, 23, 23 of the hanger 20 according to the vehicle type.

The limit switch sliders 37*g*, 37*g* are engaged with two spots of the limit switch rail 37*c* arranged in the front/rear direction. The limit switch sliders 37*g*, 37*g* are fixed on the limit switch rail 37*c* to restrict the range of vertical movement of the position determination pin 37*f*. The limit switch sliders 37*g*, 37*g* are provided respectively with the limit switches 37*h*, 37*h*. The limit switches 37*h*, 37*h* transmit a signal to the above-described controller when the vertical position determination part 37*i* is brought into contact therewith in order to set upper and lower limits of the vertical movement of the piston 37*l*. The vertical position determination part 37*i* is connected with a top end of the piston 37*l* through the coupling frame 37*j* and the piston frame 37*k*, and moves vertically as the piston 37*l* moves vertically.

The piston 37*l*, of which a lower side is fitted into the air cylinder, moves vertically by the action of the air cylinder 37*m*. By the way, the air cylinder 37*m* is driven to take in or supply air using the air intake/supply device (not shown) in accordance with an instruction from the controller based upon the signal from the limit switches 37*h*, 37*h*. Moreover, the air cylinder 37*m* is attached to the main body 37*a* through the support brackets 37*n*, 37*n*. Further, the piston frame 37*k* attached to the distal end of the piston 37*l* is secured on the support bracket 37*e*.

More specifically, when the piston 37*l* moves up and down by air supply to the air cylinder 37*m* or air intake from the air cylinder 37*m*, the position determination pin 37*f* moves up and down through the piston frame 37*k* and the support bracket 37*e*, and the vertical position determination part 37*i* moves up and down through the piston frame 37*k* and the coupling frame 37*j*. Consequently, the limit switches 37*h*, 37*h*, of which two are arranged vertically, set the upper limit position and lower limit position, and the position determination pin 37*f* moves vertically between a position (upper limit position) of insertion into the position determination hole 21*k* of the hanger 20, and an outside position (lower limit position) of the position determination hole 21*k*.

Next, a description will be given of a method for transferring vehicle bodies according to the present embodiment. The method for transferring vehicle bodies is described herein according to an operation of relocation with the drop lifter 3.

In the present embodiment, an adjustment of the support positions with respect to the vehicle body F made during relocation with the drop lifter 3 corresponds to the position adjustment step set forth in the claims.

Figure 7A:
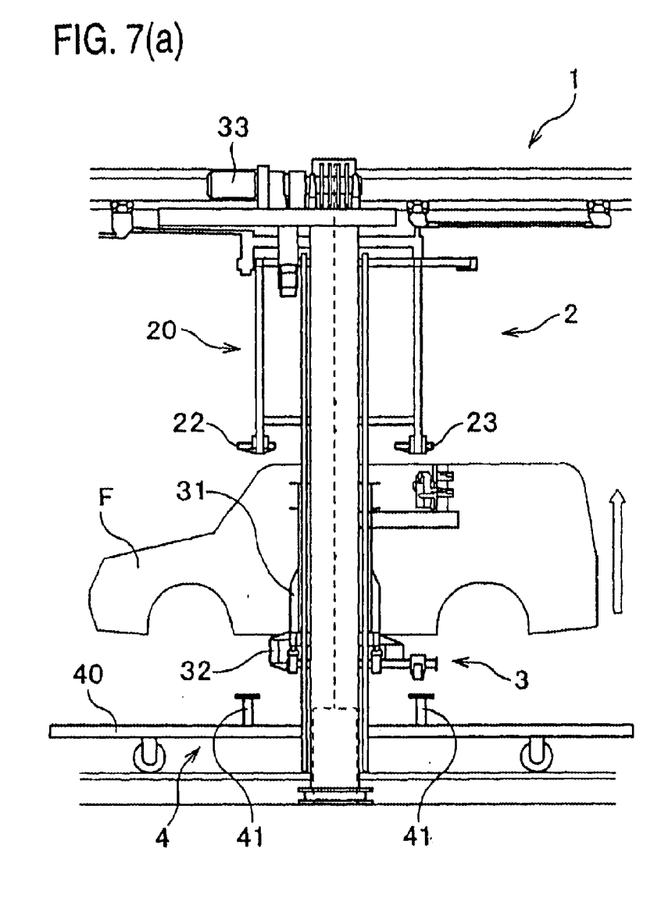
FIG. 7(a) is an operation chart of the drop lifter that is moving sliders up.
Figure 7B:
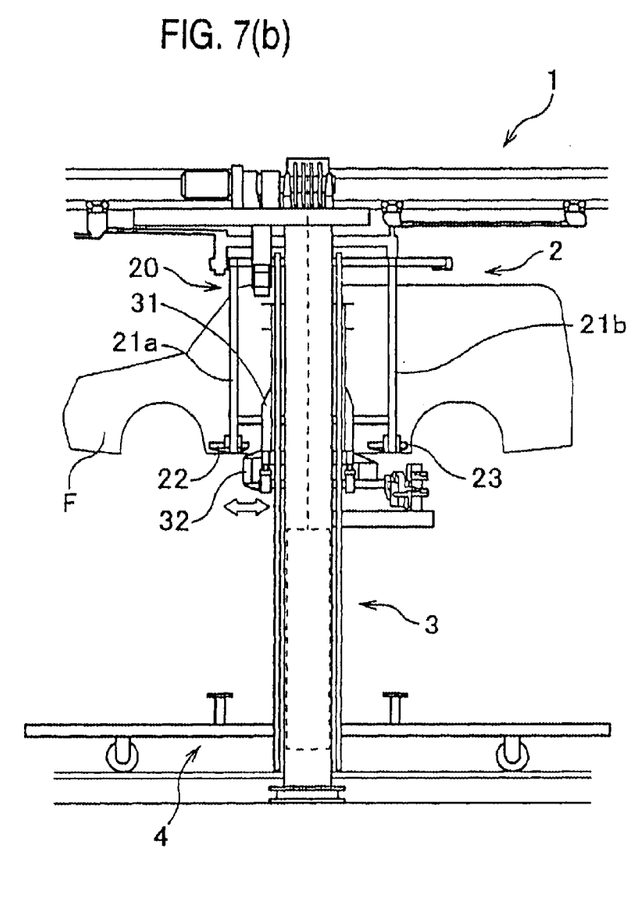
FIG. 7(b) is an operation chart of the drop lifter that is making an adjustment to support positions on the vehicle body.
Figure 8A:
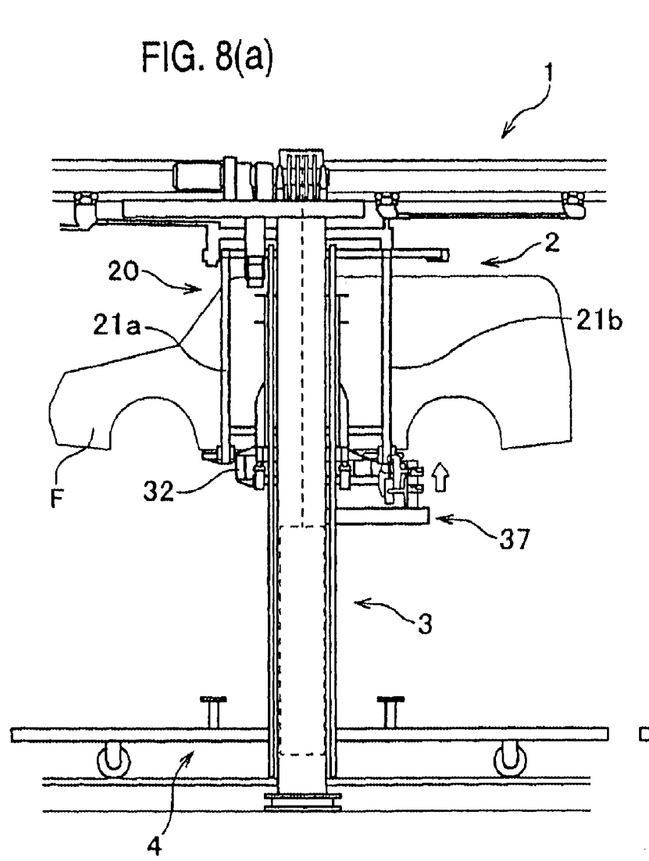
FIG. 8(a) is an operation chart of the drop lifter that is determining a position of a hanger.
Figure 8B:
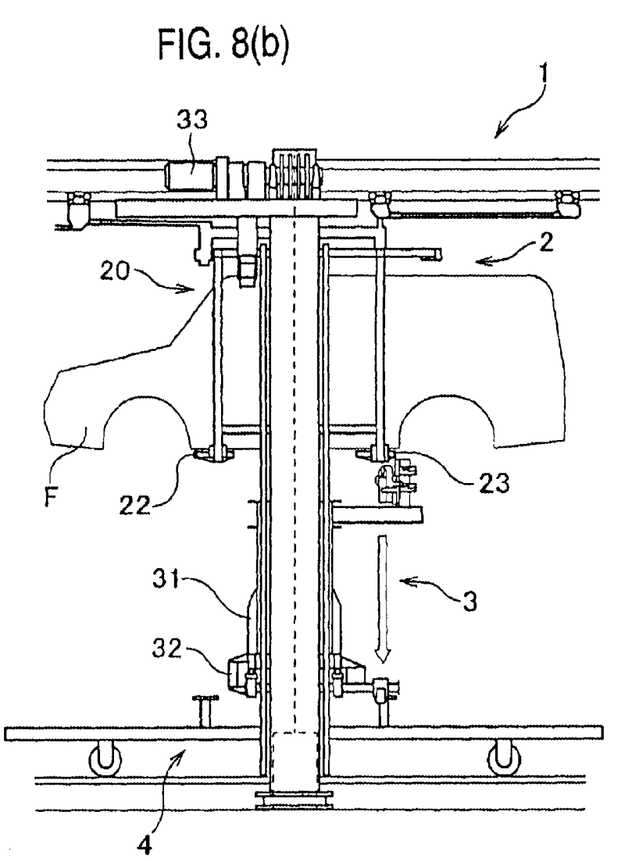
FIG. 8(b) is an operation chart of the drop lifter that is moving the sliders down.

Referring now to FIGS. 7 and 8, a description will be given of an operation of the relocation with the drop lifter 3. The drop lifter 3 is under control of the controller as described above. The controller has received inputs of information on the vehicle body F that is being transferred, from an ID card or the like, and has obtained information such as vehicle type, vehicle body width, vehicle body length, and the like. It is understood that the overhead conveyor 2 and the friction conveyor 4 are also under control of the controller (not shown). The controller may be a dedicated controller for each conveyor, or the controller for common use with the drop lifter 3.

First, the friction conveyor 4 stops the pallet 40 to stop the vehicle body F supported on the vehicle body support parts for transfer 41, . . . at a predetermined position with respect to the drop lifter 3 based upon an instruction from the controller. Then, the friction conveyor 4 fixes the pallet 40 using the pallet fixing part 43 (see FIGS. 1 and 2). The predetermined position is a position where the vehicle body support parts for relocation 32, 32 of the drop lifter 3 may support the side sill of the vehicle body F. Further, the vehicle body F is supported on the vehicle body support parts for transfer 41, . . . with the support positions adjusted in front, rear, right, and left directions with respect to the friction conveyor 4. The overhead conveyor 2 stops the hanger 20 at a position where the jack-up points of the vehicle body F may be supported on the center-of-gravity management plates 22, 22, 23, 23 of the hanger 20 based upon an instruction from the controller, if an adjustment is made to the position of the vehicle body F in the front/rear direction by the drop lifter 3.

Thereafter, the drop lifter 3 moves the vehicle body support parts for relocation 32, 32 toward the vehicle body F based upon an instruction from the controller, and supports the side sill of the vehicle body F with the vehicle body support parts for relocation 32, 32. The vehicle body F is then positioned in front, rear, right, and left directions relative to the pallet 40 of the friction conveyor 4, and thus is supported on the vehicle body support parts for relocation 32, 32 in a specific position according to the vehicle type. Having supported the vehicle body F, the drop lifter 3 drives the motor 33 to rotate based upon an instruction of the controller, and lifts the sliders 31, 31 with the vehicle body F supported on the vehicle body support parts for location 32, 32 (see FIG. 7(*a*)).

Figure 3A:
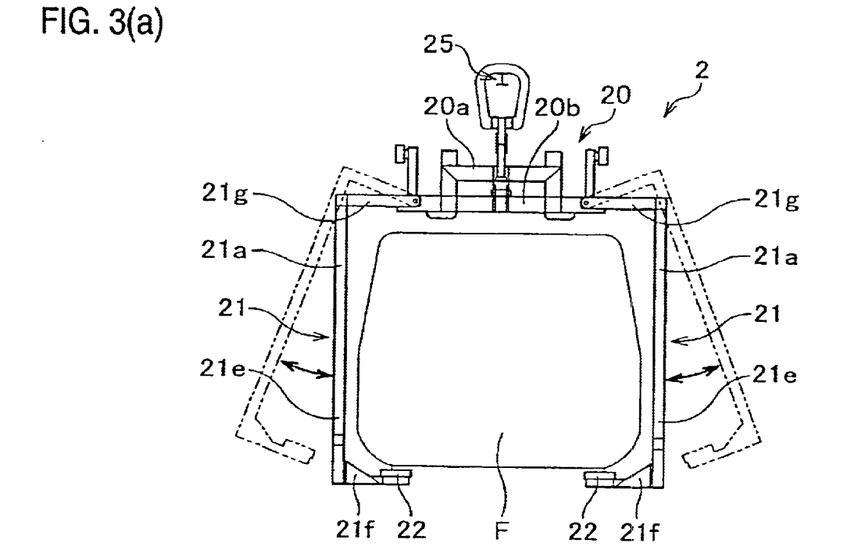
FIG. 3(a) is a front view.
Figure 3B:
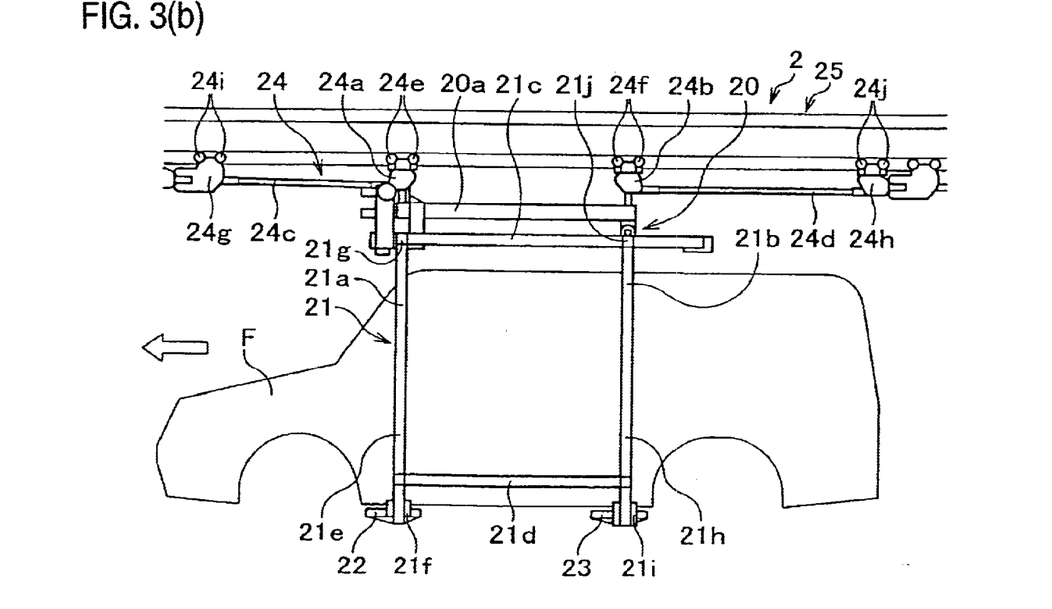
FIG. 3(b) is a side view.
Figure 4A:
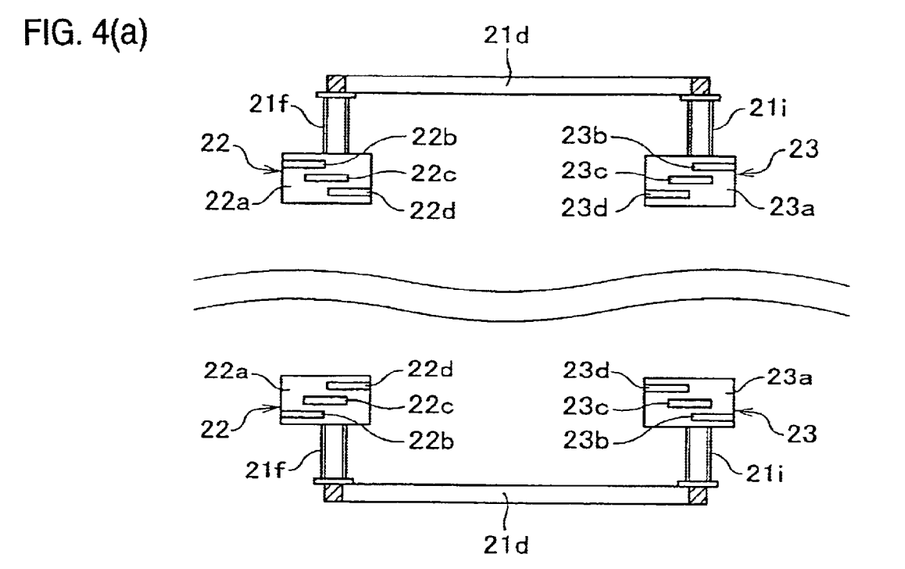
FIG. 4(a) is a front view.
Figure 4B:
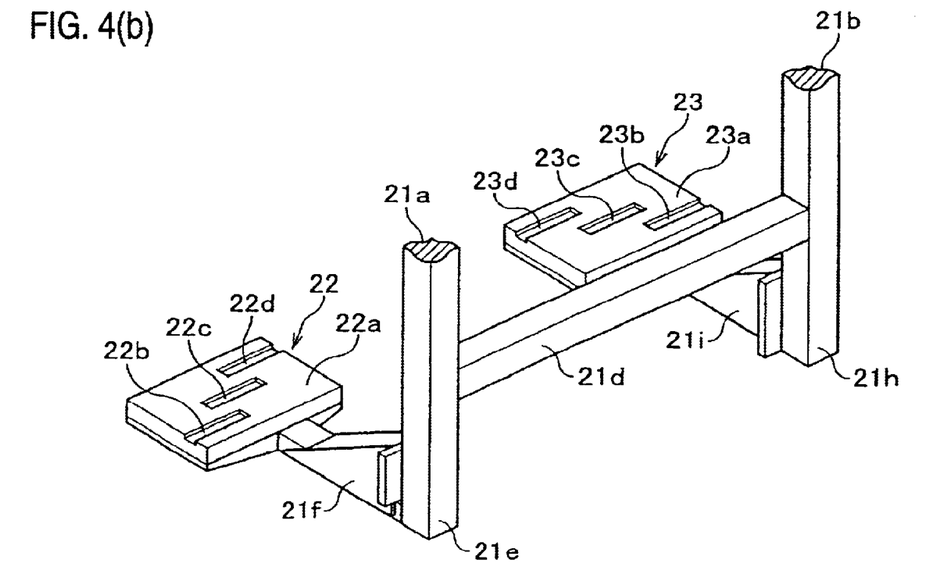
FIG. 4(b) is a perspective view of the plates at one of the sides.

Subsequently, the drop lifter 3 stops the sliders 31, 31 based upon an instruction from the controller at a position slightly above the position where the hanger 20 of the overhead conveyor 2 may support the jack-up points of the vehicle body F. At this moment, the overhead conveyor 2 stops the hanger 20 with the front arms 21*a*, 21*a* and rear arms 21*b*, 21*b* of the hanger 20 opened (see FIG. 3(*a*)).

When the sliders 31, 31 stop, the drop lifter 3 takes in air from the air cylinder 32*k* of the vehicle body support part for relocation 32, or supplies air to the air cylinder 32*k* to drive the air cylinder 32*k*, based upon an instruction from the controller (see FIGS. 5(*a*) and 5(*b*)). By the way, the controller has data corresponding to each vehicle type for determining which jack-up point support parts in the hanger 20 should be employed to support the jack-up points of the vehicle body F: the jack-up point support parts 22*b*, 22*c*, 22*d* of the front center-of-gravity management plate 22, or the jack-up point support parts 23*b*, 23*c*, 23*d* of the rear center-of-gravity management plate 23 (see FIGS. 4(*a*) and 4(*b*)). The controller also has data on a shift amount of the vehicle body support parts for relocation 32, 32 in the front/rear direction. The vehicle body support parts for relocation 32, 32 drives the air cylinder 32*k* based upon an instruction from the controller to shift the vehicle body F placed on the vehicle body placement parts 32*h*, 32*h*, 32*h* by the above shift amount in the front/rear direction (see FIGS. 5(*a*), 5(*b*) and 7(*b*)). Accordingly, the vehicle body F is so positioned that the four jack-up points on the vehicle body F may be supported with the jack-up point support parts corresponding to the vehicle type, which is selected from either of the jack-up point support parts 22*b*, 22*c*, 22*d* or the jack-up point support parts 23*b*, 23*c*, 23*d*.

After the position adjustment step using the vehicle body support parts for relocation 32, 32, the drop lifter 3 actuates the arm open/close parts 36, 36 for the hanger 20 of the overhead conveyor 2 based upon an instruction from the controller, to close the front arms 21*a*, 21*a*, and the rear arms 21b, 21b (see FIGS. 1 and 2). Further, the drop lifter 3 supplies air to the air cylinder 37m of the hanger position determination part 37, and drives the air cylinder 37m based upon an instruction from the controller (see FIGS. 6(a)–6(c)).

Then, the hanger position determination part 37 drives the air cylinder 37m to lift the position determination pin 37f until the vertical position determination part 37i is detected using the upper limit switch 37h (see FIGS. 6(a)–6(c)). Consequently, if the rear arm 21b (i.e., the hanger 20) is in a predetermined position with respect to the drop lifter 3, the position determination pin 37f is inserted into the position determination hole 21k of the hanger 20 (see FIGS. 6(a) and 8(c)). If the position determination pin 37f fails to get in the position determination hole 21k of the hanger 20, the relocating operations for the vehicle body F by the drop lifter 3 is suspended.

After the position determination step for the hanger 20, the drop lifter 3 drives the motor 33 to rotate based upon an instruction from the controller, and lowers the sliders 31, 31 with the vehicle body F supported on the vehicle body support parts for relocation 32, 32. Accordingly, the vehicle body F that has been supported at the side sill using the vehicle body support parts for relocation 32, 32 of the drop lifter 3 has come to undergo the support on the jack-up points using the center-of-gravity management plates 22, 22, 23, 23 of the overhead conveyor 2 (see FIG. 8(b)). At that moment, the vehicle body F is supported in such a manner that the jack-up points are placed on the jack-up point support parts 22b, 22b, 23b, 23b in case of a large-sized passenger car, the jack-up points are placed on the jack-up point support parts 22c, 22c, 23c, 23c in case of a medium-sized passenger car, or the jack-up points are placed on the jack-up point support parts 22d, 22d, 23d, 23d. This resultantly allows the center of gravity of the vehicle body F of every vehicle type to be substantially aligned (or precisely aligned) with the center of the hanger 20, so that the vehicle body F may be supported with excellent weight balance relative to the hanger 20.

After the relocation step, the drop lifter 3 takes in air from the air cylinder 37m of the hanger position determination part 37 based upon an instruction from the controller, and drives the air cylinder 37m (see FIG. 6(b)). Then, the hanger position determination part 37 drives the air cylinder 37m to lower the position determination pin 37f until the vertical position determination part 37i is detected using the lower limit switch 37h (see FIG. 6(c)). Further, after the sliders 31, 31 have lowered, the overhead conveyor 2 conveys the vehicle body F supported by the hanger 20 based upon an instruction from the controller. Thereafter, the vehicle body F is mounted with various parts with weight balance thereof kept well.

According to the apparatus and method for transferring vehicle bodies in the present embodiment, the vehicle body support parts for relocation 32, 32 of the drop lifter 3 are used to make an adjustment to the support positions in accordance with the vehicle type of the vehicle body F, and the vehicle body F is placed on the jack-up point in accordance with the vehicle type of the center-of-gravity management plates 22,22,23,23 of the hanger 20 support parts 22b–22d, 23b–23d of the center-of-gravity plates of the hanger 20. Thus, the center of gravity of the vehicle body (two-dimensional) and the center of the hanger 20 (two-dimensional) are substantially aligned or precisely aligned, so that the vehicle body F is supported on spots that provide good weight balance relative to the hanger 20. Therefore, even if the vehicle body F is inclined without keeping a horizontal posture during transfer using the overhead conveyor 2, the vehicle body F keeps a position thereof unchanged relative to the hanger 20, and is stably transferred. Further, the hanger 20 has the jack-up point support parts 22b–22d, 23b–23d formed in the center-of-gravity plates 22, 23 corresponding to the vehicle type, and thus may accommodate differences in the total length, total width, position of the center of gravity, or the like among the vehicle types, with a very simple construction.

The present invention is not limited to the above-described embodiments, but various other embodiments may be implemented without departing from the spirit and scope thereof.

For example, although the position adjustment means is incorporated in the drop lifter in the above embodiment, the position adjustment means may be provided as a discrete unit, or incorporated in the other unit.

Moreover, although the jack-up point support parts as corresponding to three vehicle types are provided in the center-of-gravity management plates in the present embodiment, the jack-up point support parts may be provided without restrictions on the number of vehicle types.

Furthermore, the jack-up points of the vehicle body is supported using the center-of-gravity management plates in the present embodiment, but the vehicle body may be supported at other spots.

INDUSTRIAL APPLICABILITY

The apparatus for transferring vehicle bodies of the present invention uses a position adjustment means to adjust support positions on the vehicle body so that a center of gravity of the vehicle body of each vehicle type and a center of a hang-and-transfer means are aligned or substantially aligned with each other. Therefore, this apparatus for transferring vehicle bodies may support the vehicle body using the hang-and-transfer means in a well-weight balanced condition, and thus stably transfer the vehicle body.

The apparatus for transferring vehicle bodies of the present invention includes a center-of-gravity management plate having vehicle body support parts according to the vehicle type, so as to accommodate differences in the total length, total width, and position of the center of gravity of the vehicle body due to variations of vehicle type. Therefore, when the apparatus for transferring vehicle bodies uses a specific set of the vehicle body support parts to support the vehicle body according to the vehicle type of the vehicle body, the center of gravity of the vehicle body of each vehicle type and the center of the hang-and-transfer means are aligned or substantially aligned with each other. As a result, the apparatus for transferring vehicle body realizes a very simple structure of the hang-and-transfer means that may stably transfer vehicle bodies of various vehicle types.

The method for transferring vehicle bodies of the present invention includes a position adjustment step of adjusting support positions on the vehicle body so that a center of gravity of the vehicle body of each vehicle type and a center of a hang-and-transfer means are aligned or substantially aligned with each other. Therefore, the method for transferring vehicle bodies may serve to support the vehicle body using the hang-and-transfer means in a well-weight-balanced condition, and thus may serve to stably transfer the vehicle body.

The method for transferring vehicle bodies of the present invention employs a center-of-gravity management plate having vehicle support parts adaptable to various vehicle types, so as to accommodate differences in the total length, total width, and position of the center of gravity of the vehicle body due to variations of vehicle type. Therefore, the method for transferring vehicle bodies includes the position adjustment step in which the vehicle body is supported on some of vehicle body support parts as corresponding to the vehicle body of each vehicle type, so that the center of gravity of the vehicle body of each type and the center of the hang-and-transfer means are aligned or substantially aligned with each other. As a result, the method for transferring vehicle bodies may utilize the hang-and-transfer means having a very simple structure to stably transfer the vehicle body of various types.

What is claimed is:

1. An apparatus for transferring vehicle bodies that hangs and transfers a vehicle body of every vehicle type, the apparatus comprising:
    a hang-and-transfer means that supports the vehicle body in a hanging condition, and moves along a transfer path; and
    a position adjustment means that adjusts supporting positions on the vehicle body in the hang-and-transfer means based upon a center of gravity of the vehicle body of each vehicle type.

2. An apparatus for transferring vehicle bodies according to claim 1, wherein the hang-and-transfer means includes center-of-gravity management plates each having a plurality of vehicle body support parts that support the vehicle body according to the vehicle type of the vehicle body.

3. An apparatus for transferring vehicle bodies according to claim 2, wherein each of the plurality of vehicle body support parts of each of the center-of-gravity management plates has a concave shape formed on a plate shaped base for supporting the vehicle body.

4. An apparatus for transferring vehicle bodies according to claim 1, wherein the position adjustment means includes frames slidable along guide rails for moving the supporting positions in front-rear and up-down directions.

5. A method for transferring vehicle bodies that hangs and transfers a vehicle body of every vehicle type, the method including a position adjustment step of adjusting supporting positions on the vehicle body in a hang-and-transfer means based upon a center of gravity of the vehicle body of each vehicle type,
    wherein the hang-and-transfer means supports the vehicle body in a hanging condition, and moving along a transfer path.

6. A method for transferring vehicle bodies according to claim 5, wherein the position adjustment step is performed by position adjustment means that include frames slidable along guide rails for moving the supporting positions in front-rear and up-down directions.

7. A method for transferring vehicle bodies according to claim 5, wherein the hang-and-transfer means includes center-of-gravity management plates each having a plurality of vehicle body support parts that support the vehicle body according to each vehicle type of the vehicle body, and
    wherein the position adjustment step allows the vehicle body support parts to place the vehicle body according to the vehicle type.

8. A method for transferring vehicle bodies according to claim 7, wherein each of the vehicle body support parts has a concave shape formed on a plate shaped base for facilitating the position adjustment step.

* * * * *